(No Model.)
J. F. MONAGHAN.
SAW GUARD.
No. 347,884. Patented Aug. 24, 1886.
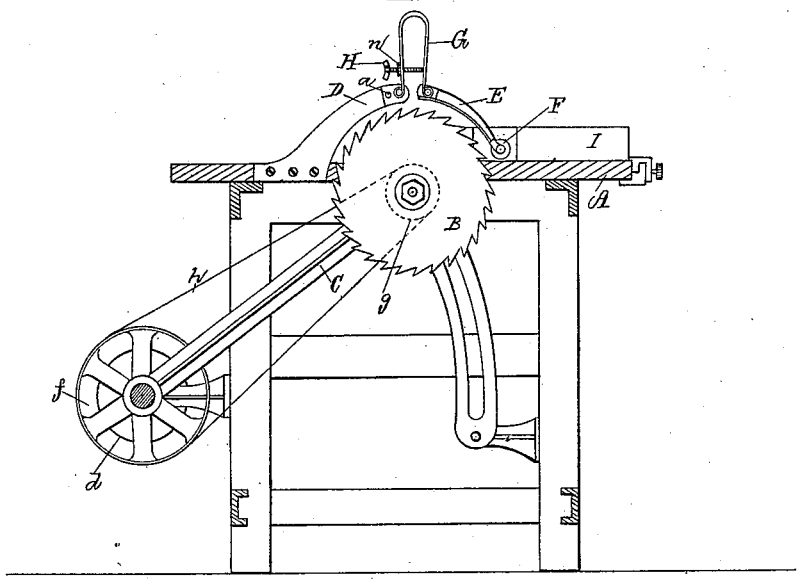
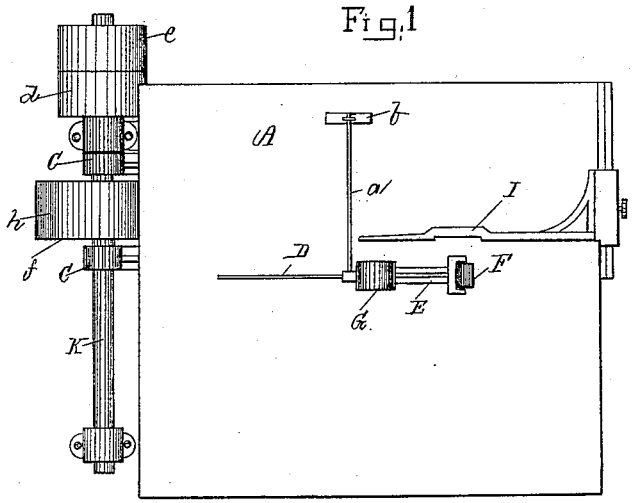
Witnesses
S. N. Piper
Ernest B. Pratt
Inventor
John F. Monaghan
by R. H. Eddy atty

UNITED STATES PATENT OFFICE.

JOHN FRANCIS MONAGHAN, OF PALMER, MASSACHUSETTS, ASSIGNOR, BY MESNE ASSIGNMENTS, TO HIMSELF AND OREN B. SMITH, OF SAME PLACE.

SAW-GUARD.

SPECIFICATION forming part of Letters Patent No. 347,884, dated August 24, 1886.

Application filed August 3, 1885. Renewed June 12, 1886. Serial No. 204,970. (No model.)

*To all whom it may concern:*

Be it known that I, JOHN FRANCIS MONAGHAN, of Palmer, in the county of Hampden, of the Commonwealth of Massachusetts, have invented a new and useful Improvement in Presser-Guards for Circular Saws; and I do hereby declare the same to be described in the following specification and represented in the accompanying drawings, of which—

Figure 1 is a top view, and Fig. 2 a vertical section, of a circular saw and its supporting-table provided with my invention, the nature of which is defined in the claims hereinafter presented.

In the said drawings, the table is shown at A and the saw at B, the arbor of such saw being supported by two vibratory arms, C, so as to admit of the saw being moved in a circular path to different altitudes relatively to the top of the table, as occasion may require. The said arms C are pivoted on a driving-shaft, K, arranged as shown, and provided with a fast pulley, $d$, and a loose one, $e$. There is also fixed on the shaft K a pulley, $f$, about which and a pulley, $g$, (shown in dotted lines in Fig. 2,) an endless belt, $h$, travels in order to aid in putting the saw in revolution.

The saw and its operative mechanism, the table, and the adjustable guide I are essentially what are in common use, and therefore are not to be considered as of my invention, except in the combination of the table and saw with the stationary guard and the movable guard and presser and their connecting-spring, as hereinafter described.

Fixed to the table in rear of the saw and in the plane of it, and carried so as to project over it, is a thin metallic arm or guard, D, having a thickness corresponding to or a little less than that of the saw. In advance of the said arm there is an auxiliary curved arm, E, carrying a roller, F, in its lower end part, the two arms being connected at their upper ends to the extremities of a bow-spring, G, through one prong of which a screw, H, is screwed, and bears at its inner end against the other arm, and not only serves to regulate the distance of the presser above the table, but answers as a stop to arrest the auxiliary arm to prevent it from falling upon the teeth of the saw. A set-nut, $n$, is screwed on the screw. The said auxiliary arm by being connected to the stationary guard by a bow-spring, as represented, will be at liberty to rise, so as to cause the roller to bear on the upper surface of a piece of wood or material while such piece may be advancing toward and being cut by the saw. This arm and its roller and the supporting-spring of the arm serve as a presser to hold down upon the table the board or material while it may be in the act of being cut by the saw. The auxiliary arm and the stationary arm answer also as guards to prevent the arm or hand of a person from accidental contact with the teeth of the saw and being injured thereby while he may be in the act of advancing the material on the table and the saw may be in operation on such material.

To prevent the stationary guard from vibrating, there projects from it at its upper end or part a rod, $a$, that extends from a post or standard, $b$, erected on the top of the table. I is an adjustable guide for the work to bear against in moving to the saw.

I claim—

1. The combination of the stationary curved guard or arm D, the auxiliary or movable curved arm or presser-guard E, and their connecting bow-spring G, arranged to extend directly over the circular saw, with the said saw and the table, all being substantially as set forth.

2. The combination of the stop-screw H, arranged in the spring G, as set forth, with such spring and with the arm D, and guard E, connected thereby, all being arranged over a saw, E, and the arm D being fixed to the table, substantially as represented.

3. The combination, with the table and circular saw, of the curved stationary guard and its supporting rod and post, and of the curved arm or presser, and the bow-spring connecting it with the stationary guard, such guard, presser, and spring being arranged over the saw, and all being substantially as set forth.

4. The combination of the stationary guard, the auxiliary guard or presser, and their connecting bow-spring, arranged and for use with a circular saw and its table essentially as represented.

JOHN FRANCIS MONAGHAN.

Witnesses:
R. H. EDDY,
S. N. PIPER.